Oct. 11, 1960   R. SMITH   2,955,785
FLOAT LANDING GEAR
Filed April 20, 1956   3 Sheets-Sheet 1
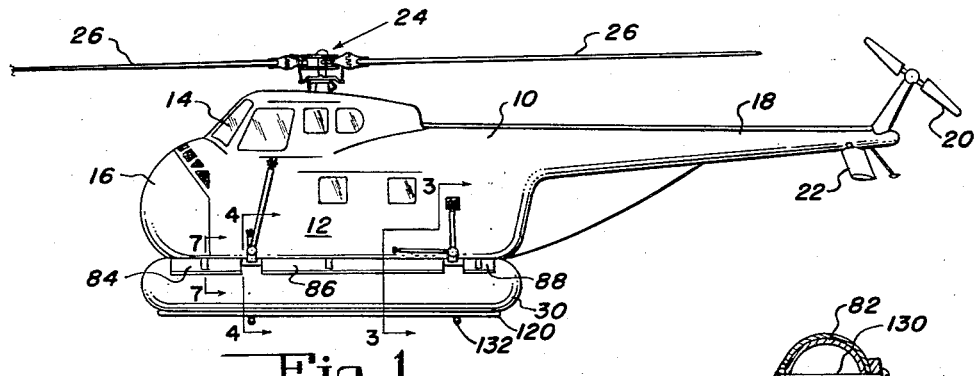
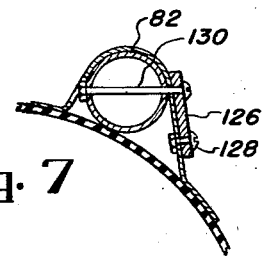
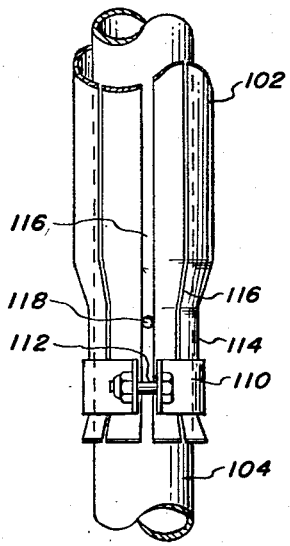
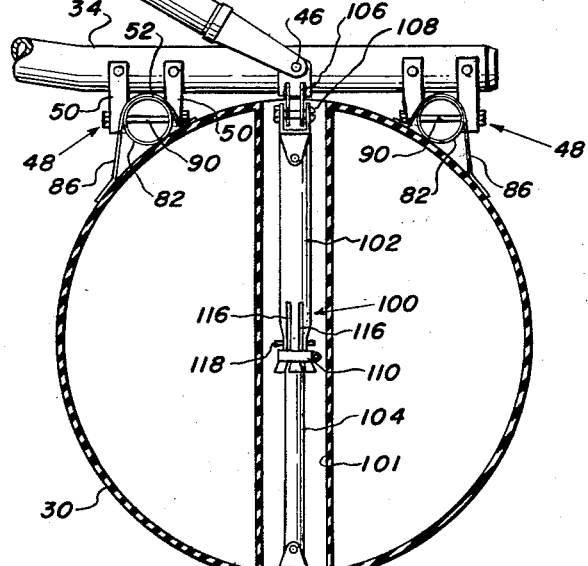
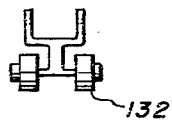
INVENTOR
RICHARD SMITH Oct. 11, 1960  R. SMITH  2,955,785
FLOAT LANDING GEAR
Filed April 20, 1956  3 Sheets-Sheet 2
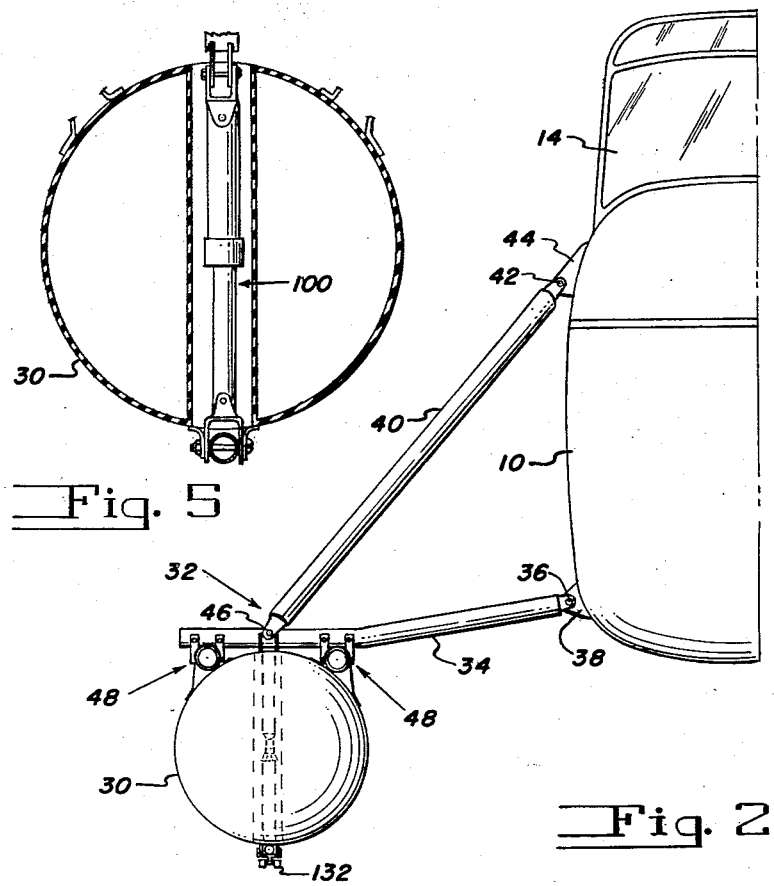
Fig. 5
Fig. 2
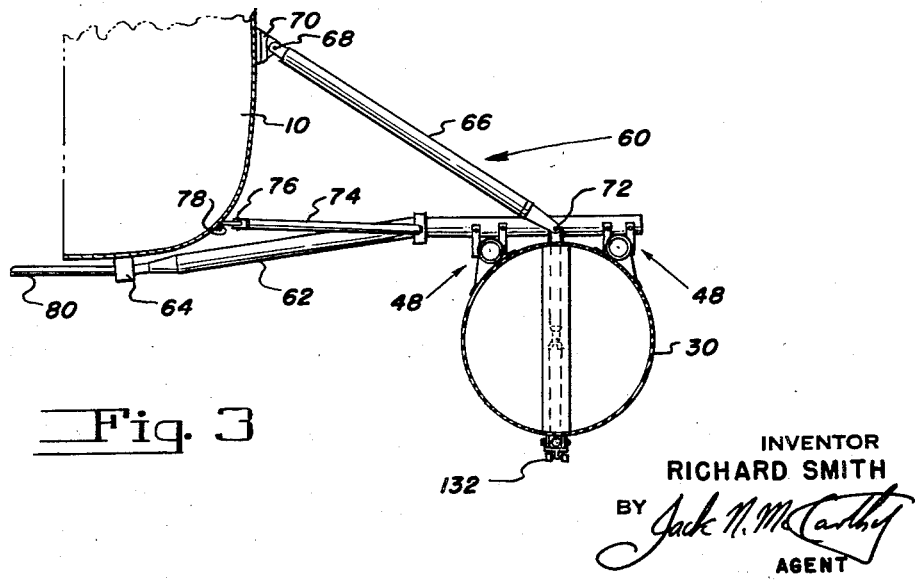
Fig. 3
INVENTOR
RICHARD SMITH
BY Jack N. McCarthy
AGENT

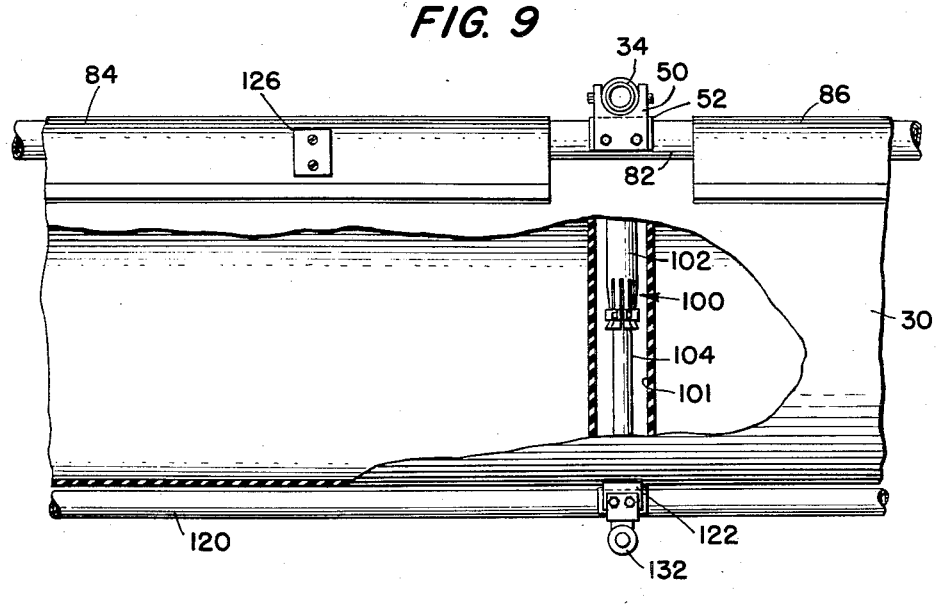

United States Patent Office

2,955,785
Patented Oct. 11, 1960

2,955,785

FLOAT LANDING GEAR

Richard Smith, Milford, Conn., assignor to United Aircraft Corporation, East Hartford, Conn., a corporation of Delaware Filed Apr. 20, 1956, Ser. No. 579,556

7 Claims. (Cl. 244—101)

This invention relates to aircraft landing gear and more particularly to amphibious landing gear for helicopters.

An object of this invention is to provide a landing gear having a light rigid support in combination with light resilient type aircraft supporting bags.

Another object of this invention is to provide shock absorbing mechanism extending through a resilient type supporting bag.

A further object of this invention is to provide a landing gear arrangement which tends to eliminate the problem of ground oscillation which is generally referred to as "ground resonance." The term "ground resonance" is more correct from a common usage standpoint than from the standpoint of accurately describing a very interesting and sometimes very dangerous phenomenon peculiar to helicopters with hinged rotor blades.

Another object of the invention is to provide a landing gear arrangement in which the drag loads of the bags are taken through fixed structure.

Other objects will be apparent from the following disclosure.

In the drawings:

Fig. 1 is a side elevational view of a helicopter provided with a landing gear to be hereinafter described for supporting the helicopter on land, water or other surfaces.

Fig. 2 is a front view of the right side of the helicopter shown in Fig. 1 showing the connection of the supporting bag to the helicopter.

Fig. 3 is a view taken along the line 3—3 of Fig. 1.

Fig. 4 is a sectional view taken along the line 4—4 of Fig. 1.

Fig. 5 is a view similar to Fig. 4 showing an oleo strut.

Fig. 6 is a view of the central portion of the shock absorbing mechanism which extends through the aircraft supporting bag.

Fig. 7 is a sectional view taken along the line 7—7 of Fig. 1.

Fig. 8 is a view showing a set of wheels adapted to be connected to the end of each shock absorbing mechanism extending below the aircraft supporting bag.

Fig. 9 is a fragmentary longitudinal transverse section through the supporting bag.

The invention has been illustrated in connection with a single sustaining rotor helicopter although it is equally applicable to any direct lift aircraft. As shown in Fig. 1, the helicopter includes a fuselage or body portion 10 which encloses a passenger or cargo compartment 12, a pilot compartment 14 and an engine compartment 16. The body also includes a tail cone 18 on the aft end of which is supported an anti-torque rotor 20. The tail rotor 20 is driven at a suitable speed to counteract the torque of the main rotor. An inverted V-tail 22 is provided on the tail cone 18 for stabilizing purposes. This forms no part of the present invention, but it is disclosed and claimed in Patent No. 2,630,985. The main lift rotor includes the usual rotor head 24 and a plurality of hinged rotor blades 26.

The helicopter landing gear, with which this invention is particularly concerned, includes a pair of aircraft supporting bags 30. These bags are inflatable and may be made of rubber, rubber impregnated canvas or other suitable material for a soft or resilient type bag. The aircraft supporting bags 30 are positioned one on each side of said helicopter by positioning means extending outwardly from each side of said fuselage or body portion 10. Each supporting bag is connected at its front end and rear end to the fuselage 10 by said means.

Since the locating or positioning means for each supporting bag is the same, only one will be described. The front positioning means 32, as shown in Fig. 4, of a supporting bag 30 comprises a positioning arm 34 extending outwardly to the side of said aircraft. This arm 34 is mounted by a bolt 36 to a bracket 38 which is fixed to the fuselage 10. A supporting member 40 is connected at one end by a bolt 42 to a bracket 44 which is fixed to the fuselage and is connected at its other end by a bolt 46 to arm 34 at a point located inwardly from its outer free end. This member 40 fixes arm 34 against any up and down movement.

A rod receiving bracket 48, as shown in Fig. 4, is located on a positioning arm 34 on either side of the point where member 40 is attached thereto. One bracket 48 is located adjacent the free end of the arm 34 outwardly from bolt 46 and the other bracket is located on the arm 34 a like distance inwardly from the bolt 46. Each bracket 48 comprises two depending members 50 having strap member 52 therebetween contoured to receive a rod in a manner to be described hereinafter.

The rear positioning means 60, as shown in Fig. 3, of a supporting bag 30 comprises a positioning arm 62 extending outwardly to the side of said aircraft. This arm 62 is attached to a bracket 64 fixed to the fuselage 10. A supporting member 66 is connected at one end by a bolt 68 to a bracket 70 which is fixed to the fuselage and is connected at its other end by a bolt 72 to arm 62 at a point located inwardly from its outer free end. This member 66 fixes arm 62 against any up and down movement. A second supporting member 74 is connected at one end by a bolt 76 to a bracket 78 which is fixed to the fuselage at a point forward of the bracket 64. The second supporting member 74 is connected at its other end to arm 62 at a point located between bolt 72 and bracket 64. This second member 74 fixes arm 62 against any front and rear movement. A positioning rod 80 is located between the brackets 64 of the rear positioning means 60 of each side of said aircraft.

A rod receiving bracket 48 is located on each positioning arm 62 on either side of the point where a member 66 is attached thereto. These brackets are attached in the same manner as they are to positioning arm 34. The outboard brackets 48 of the positioning arms 34 and 62 of the front and rear positioning means 32 and 60, respectively, are aligned one with the other on each side of the aircraft on a line parallel to the center line of the fuselage or body 10 of the aircraft. The inboard brackets 48 are aligned in the same manner. Each supporting bag 30 has means on each side thereof for receiving a rod, or tube, 82 approximately the length of said bag. These means each consist of three lengths of strap material 84, 86 and 88. The strap material may be of the same material as the supporting bag or any other suitable material. These straps may be fixed to the bag in any manner such as by cementing.

When a supporting bag 30 is to be mounted on its positioning means, a rod, or tube, 82 is slid into position on each side of the bag within its respective straps 84, 86 and 88. The space between the straps 84 and 86 and the space between the straps 86 and 88 on each bag is located at a point where the rod receiving brackets 48 of the front positioning means and rear positioning means can be attached to the rods 82. Where each rod 82 fits into the strap member 52 of a bracket 48, a bolt 90 extends through both the bracket and the rod to fixedly hold them together.

Shock absorbing means 100 extends from a point on the front and rear positioning means of each supporting bag 30, through a passageway 101 in each supporting bag to a point below the bag. A friction type shock absorbing strut having two telescoping members 102, 104 is shown in Fig. 4. Since the shock absorbing means is attached in the same manner at all four locations only one attachment is described. The outer telescoping member 102 is connected to a bracket 106 on a positioning arm by means of a bolt 108. A clamp 110 is provided for varying the amount of friction desired between the members 102 and 104. The lower end of telescoping member 102 is slotted as at 116 to permit the clamp 110 to vary the circumference of the member. This is accomplished by tightening or loosening the bolt 112 of the clamp 110. The lower end of the telescoping member 102 is flanged outwardly below the clamp 110 to retain it on the necked down portion 114. A pin 118 extends through the upper end of the inner telescoping member 104 and projects through a slot 118 above the clamp 110. This retains the inner telescoping member 104 of the shock absorbing means in its assembled form. While a frictional type shock absorbing strut has been shown, other means such as an oleo strut, shown in Fig. 5, can be used in place thereof.

A rod 120 extends under each bag for its length and is attached to the end of each shock absorbing means extending therethrough. Each bag itself is also attached to the shock absorbing means passing therethrough at this point by flaps 122 fixed to each bag. Bolts 124 extend through the flaps 122, shock absorbing means 100 and rod 120 at this point.

Each bag is fixed to its cooperating rods 82 by use of the straps 84, 86 and 88 on each side thereof. At spaced points along the length of the strap members small metal plates 126 are fixed thereto as by bolts 128. Bolts 130 are provided which pass through each metal plate 126, cooperating strap and rod 82 to prevent movement between the straps and the cooperating rod 82.

Wheels 132 are provided which may be attached to the lower end of each shock absorbing means which provide for easier movement between the aircraft and a landing surface under certain circumstances.

In operation, as the helicopter approaches a landing surface, the bags 30 will be in an extended position as shown in Fig. 4, at this time the shock absorbing means will be fully extended. When a helicopter lands on a solid landing surface it places into action the shock absorbing means and starts to distort the bag 30 by flattening it at the bottom at approximately the same time. This action of the shock absorbing means resists the compression of the bag. As the bag tends to expand due to the rebound action, the shock absorbing means will also be in operation in this direction. This provides a high damping action. However, it is to be remembered that the amount of damping can be controlled depending on the amount necessary to provide stability.

When a helicopter lands on a liquid landing surface it starts to distort the bag 30 by flattening it at the bottom and this movement places into action the shock absorbing means.

Although only one specific embodiment is shown, it is to be understood that other modifications may be constructed which come within the scope of the invention claimed below.

I claim:

1. In a direct lift aircraft having a fuselage, a pair of aircraft supporting bags for supporting said aircraft on any landing surface, means for positioning each supporting bag on said fuselage, each positioning means including an arm extending outwardly from the front and rear of said fuselage, means connecting one bag at its top to both arms of said positioning means on one side of said fuselage, means connecting the other bag at its top to both arms of said positioning means on the other side of said fuselage, each bag having two passageways extending therethrough, one shock absorbing strut extending through each passageway, each shock absorbing strut being connected at its upper end directly to said positioning means, each shock absorbing strut being connected at its lower end to the bag adjacent the end of its passageway, each strut being variable in length so that it can move in accordance with changes in the height of the bag through which it extends.

2. A direct lift aircraft having a landing gear comprising bag positioning means for each side of said aircraft, each positioning means including two arms extending outwardly from said aircraft, an aircraft supporting bag for each bag positioning means, means connecting each bag to its bag positioning means, said bags having passageways extending therethrough, and a shock absorbing strut including cooperating telescoping members extending through the passageways of said bags, each shock absorbing strut being connected at the top of a telescoping member to an arm of said bag positioning means, each shock absorbing strut also being connected at the bottom of another telescoping member to the bottom of its cooperating bag, said shock absorbing strut being arranged to transmit and resist compressive forces.

3. A direct lift aircraft having a landing gear comprising bag positioning means for each side of said aircraft, each positioning means including two arms extending outwardly from said aircraft, each arm being fixed against movement in an up and down direction, an aircraft supporting bag for each bag positioning means, means connecting each bag to its bag positioning means, said bags having passageways extending therethrough, and a shock absorbing strut including cooperating telescoping members extending through the passageways of said bags, each shock absorbing strut being connected at the top of a telescoping member to an arm of said bag positioning means, each shock absorbing strut also being connected at the bottom of another telescoping member to the bottom of its cooperating bag, said shock absorbing strut being arranged to transmit and resist compressive forces.

4. A direct lift aircraft having a landing gear comprising bag positioning means for each side of said aircraft, each positioning means including two arms extending outwardly from said aircraft, a link connecting the outer end of each arm to said aircraft to prevent movement of each arm in an up and down direction, an aircraft supporting bag for each bag positioning means, means connecting each bag to its bag positioning means, said bags having passageways extending therethrough, and a shock absorbing strut including cooperating telescoping members extending through the passageways of said bags, each shock absorbing strut being connected at the top of a telescoping member to an arm of said bag positioning means, each shock absorbing strut also being connected at the bottom of another telescoping member to the bottom of its cooperating bag, said shock absorbing strut being arranged to transmit and resist compressive forces.

5. A direct lift aircraft having a landing gear comprising bag positioning means for each side of said aircraft, each positioning means including two arms extending outwardly from said aircraft, an aircraft supporting bag for each bag positioning means, means connecting each bag to its bag positioning means, each bag having two passageways extending therethrough, each passageway having a top and bottom opening, a shock absorbing strut separate from said bag positioning means extending through each of said passageways, each shock absorbing strut being connected at the top of its cooperating bag adjacent the top opening of its passageway to an arm of said bag positioning means, each shock absorbing strut also being connected to the bottom of its cooperating bag adjacent the bottom opening of its passageway.

6. A direct lift aircraft having a landing gear comprising bag positioning means for each side of said aircraft, each positioning means including two arms extending outwardly from said aircraft, said positioning means including two longitudinal members spaced apart connecting the two arms, an aircraft supporting bag for each bag positioning means, means connecting each bag adjacent to and under the two members of its positioning means, each bag having two passageways extending therethrough, each passageway having a top and bottom opening, a shock absorbing strut separate from said bag positioning means extending through each of said passageways, each shock absorbing strut being connected at the top of its cooperating bag adjacent the top opening of its passageway to an arm of said bag positioning means, each shock absorbing strut also being connected to the bottom of its cooperating bag adjacent the bottom opening of its passageway.

7. A direct lift aircraft having a landing gear comprising bag positioning means for each side of said aircraft, each positioning means including two arms extending outwardly from said aircraft, said positioning means including two longitudinal members spaced apart connecting the two arms, an aircraft supporting bag for each bag positioning means, means connecting each bag adjacent to and under the two members of its positioning means, each bag having two passageways extending therethrough, each passageway having a top and bottom opening, a shock absorbing strut separate from said bag positioning means extending through each of said passageways, each shock absorbing strut being connected at the top of its cooperating bag adjacent the top opening of its passageway to an arm of said bag positioning means, each shock absorbing strut also being connected to the bottom of its cooperating bag adjacent the bottom opening of its passageway, a rod connecting the bottom of each pair of struts of each bag extending below the bottom openings of their passageways.

References Cited in the file of this patent

UNITED STATES PATENTS

| | | |
|---|---|---|
| 1,257,413 | Sloper | Feb. 26, 1918 |
| 1,892,064 | Markey | Dec. 27, 1932 |
| 2,396,189 | Millor | Mar. 5, 1946 |
| 2,494,445 | Moeller | Jan. 10, 1950 |
| 2,544,794 | Kelley et al. | Mar. 13, 1951 |
| 2,670,159 | Barr | Feb. 23, 1954 |
| 2,702,171 | Katzenberger | Feb. 15, 1955 |

OTHER REFERENCES

"American Helicopters," pages 10 and 11, December 1952.